(12) United States Patent
Wright et al.

(10) Patent No.: US 8,065,184 B2
(45) Date of Patent: Nov. 22, 2011

(54) ESTIMATING AD QUALITY FROM OBSERVED USER BEHAVIOR

(75) Inventors: Daniel Wright, Millbrae, CA (US); Daryl Pregibon, Summit, NJ (US); Diane Tang, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 1274 days.

(21) Appl. No.: 11/321,076

(22) Filed: Dec. 30, 2005

(65) Prior Publication Data

US 2007/0156514 A1 Jul. 5, 2007

(51) Int. Cl.
*G06Q 30/00* (2006.01)
*G05B 19/418* (2006.01)

(52) U.S. Cl. .................... 705/14.41; 705/14.51
(58) Field of Classification Search ............ 705/14.41
See application file for complete search history.

(56) References Cited

U.S. PATENT DOCUMENTS

| | | | |
|---|---|---|---|
| 5,794,210 A | 8/1998 | Goldhaber et al. | |
| 5,848,396 A | 12/1998 | Gerace | |
| 5,918,014 A | 6/1999 | Robinson | |
| 5,937,390 A | 8/1999 | Hyodo | |
| 5,937,392 A | 8/1999 | Alberts | |
| 5,948,061 A | 9/1999 | Merriman et al. | |
| 6,006,197 A | 12/1999 | d'Eon et al. | |
| 6,006,222 A | 12/1999 | Culliss | |
| 6,009,409 A | 12/1999 | Adler et al. | |
| 6,014,665 A | 1/2000 | Culliss | |
| 6,078,901 A | 6/2000 | Ching | |
| 6,078,916 A | 6/2000 | Culliss | |
| 6,097,566 A | 8/2000 | Heller et al. | |
| 6,182,068 B1 | 1/2001 | Culliss | |
| 6,260,064 B1 | 7/2001 | Kurzrok | |
| 6,285,999 B1 | 9/2001 | Page | |
| 6,334,110 B1 | 12/2001 | Walter et al. | |
| 6,338,066 B1 | 1/2002 | Martin et al. | |
| 6,356,879 B2 | 3/2002 | Aggarwal et al. | |
| 6,430,539 B1 | 8/2002 | Lazarus et al. | |

(Continued)

FOREIGN PATENT DOCUMENTS

JP 2002-245336 A 8/2002

(Continued)

OTHER PUBLICATIONS

Advertising and Product Quality: are Heavily Advertising Products Better? Herbert J Rotfeld; Kim B Rotzoll. The Journal of Consumer Affairs (pre-1986); Summer 1976; 10, 1; ABI/INFORM Global p. 33.*

(Continued)

*Primary Examiner* — John Weiss
*Assistant Examiner* — Victoria Vanderhorst
(74) *Attorney, Agent, or Firm* — Harrity & Harrity, LLP

(57) ABSTRACT

A system obtains ratings associated with a first set of advertisements hosted by one or more servers, where the ratings indicate a quality of the first set of advertisements. The system observes multiple different first user actions associated with user selection of advertisements of the first set of advertisements and derives a statistical model using the observed first user actions and the obtained ratings. The system further observes second user actions associated with user selection of a second advertisement hosted by the one or more servers and uses the statistical model and the second user actions to estimate a quality of the second advertisement.

14 Claims, 14 Drawing Sheets

U.S. PATENT DOCUMENTS

| | | | |
|---|---|---|---|
| 6,539,377 B1 | 3/2003 | Culliss | |
| 6,567,786 B1 | 5/2003 | Bibelnieks et al. | |
| 6,647,269 B2 | 11/2003 | Hendrey et al. | |
| 6,763,334 B1 | 7/2004 | Matsumoto et al. | |
| 6,772,129 B2 | 8/2004 | Alvarez et al. | |
| 6,785,421 B1 | 8/2004 | Gindele et al. | |
| 6,963,848 B1 * | 11/2005 | Brinkerhoff | 705/10 |
| 7,007,074 B2 | 2/2006 | Radwin | |
| 7,031,932 B1 | 4/2006 | Lipsky et al. | |
| 7,130,808 B1 | 10/2006 | Ranka et al. | |
| 7,136,875 B2 | 11/2006 | Anderson et al. | |
| 7,370,002 B2 * | 5/2008 | Heckerman et al. | 705/10 |
| 7,383,258 B2 | 6/2008 | Harik et al. | |
| 7,406,434 B1 | 7/2008 | Chang et al. | |
| 7,415,423 B2 | 8/2008 | Ranka et al. | |
| 7,818,208 B1 | 10/2010 | Veach | |
| 7,827,060 B2 | 11/2010 | Wright et al. | |
| 2002/0103698 A1 | 8/2002 | Cantrell | |
| 2002/0147637 A1 | 10/2002 | Kraft et al. | |
| 2003/0023598 A1 | 1/2003 | Janakiraman et al. | |
| 2003/0032409 A1 | 2/2003 | Hutcheson et al. | |
| 2003/0046161 A1 | 3/2003 | Kamangar et al. | |
| 2004/0054577 A1 | 3/2004 | Inoue et al. | |
| 2004/0059708 A1 | 3/2004 | Dean et al. | |
| 2004/0059712 A1 | 3/2004 | Dean et al. | |
| 2004/0267723 A1 | 12/2004 | Bharat | |
| 2005/0021397 A1 | 1/2005 | Cui et al. | |
| 2005/0154717 A1 | 7/2005 | Watson et al. | |
| 2005/0251444 A1 | 11/2005 | Varian et al. | |
| 2006/0026071 A1 | 2/2006 | Radwin | |
| 2006/0173744 A1 | 8/2006 | Kandasamy et al. | |
| 2006/0288100 A1 | 12/2006 | Carson et al. | |
| 2007/0027756 A1 | 2/2007 | Collins et al. | |
| 2007/0067215 A1 | 3/2007 | Agarwal et al. | |
| 2007/0078707 A1 | 4/2007 | Axe et al. | |
| 2007/0156621 A1 | 7/2007 | Wright et al. | |
| 2007/0156887 A1 | 7/2007 | Wright et al. | |
| 2008/0097834 A1 | 4/2008 | McElfresh et al. | |
| 2010/0082439 A9 | 4/2010 | Patel et al. | |
| 2011/0015988 A1 | 1/2011 | Wright et al. | |

FOREIGN PATENT DOCUMENTS

| | | |
|---|---|---|
| JP | 2002-366838 A | 12/2002 |
| JP | 2003-141410 A | 5/2003 |
| JP | 2005-190340 A | 7/2005 |
| JP | 2005-276206 A | 10/2005 |
| JP | 2007-0524925 A | 8/2007 |
| KR | 2001-0109402 A | 12/2001 |
| KR | 2002-0038141 | 5/2002 |
| KR | 2002-0091101 | 12/2002 |
| WO | WO 01/09789 A1 | 2/2001 |
| WO | WO 01/15053 A2 | 3/2001 |
| WO | WO 03/023680 A1 | 3/2003 |
| WO | WO 2005/006141 | 1/2005 |
| WO | WO 2005/010702 A2 | 2/2005 |
| WO | WO 2005/033879 | 4/2005 |
| WO | WO 2005/043344 | 5/2005 |
| WO | WO 2005/052753 | 6/2005 |
| WO | WO 2005/062863 | 7/2005 |

OTHER PUBLICATIONS

Office Action from U.S. Appl. No. 11/321,046 dated Feb. 19, 2009, 23 pages.
Office Action from U.S. Appl. No. 11/321,064 dated Feb. 18, 2009, 26 pages.
Shun-Zheng Yu et al., "Dynamic Web pages for location-based services": Jul. 17-19, 2002.
Office Action from U.S. Appl. No. 11/167,581, dated Mar. 3, 2009, 16 pages.
Office Action from U.S. Appl. No. 11/321,046, dated Sep. 28, 2010, 23 pages.
Office Action from U.S. Appl. No. 12/890,271, dated Apr. 1, 2011, 27 pages.
Co-pending U.S. Appl. No. 11/167,581; entitled "Accurately Estimating Advertisement Performance," filed Dec. 30, 2005; Eric Veech; 39 pages.
Co-pending U.S. Appl. No. 10/878,926; entitled "Systems and Methods for Deriving and Using an Interaction Profile," filed Jun. 28, 2004; Alexis Jane Battle et al; 85 pages.
U.S. Appl. No. 11/321,046; entitled "Predicting Ad Quality," filed Dec. 30, 2005; Daniel Wright et al.
U.S. Appl. No. 11/321,064; entitled "Using Estimated Ad Qualities for Ad Filtering, Ranking and Promotion," filed Dec. 30, 2005; Daniel Wright et al.
M. Fang et al.: Computing Iceberg Queries Efficiently, Proceedings of the 24$^{th}$ Very Large Data Bases Conference, 1998, 12 pages.
S. Brin and L. Page: The Anatomy of a Large-Scale Hypertextual Search Engine, 7$^{th}$ International World Wide Web Conference, 1998, 20 pages.
International Preliminary Report on Patentability dated Jul. 10, 2008 issued in international application No. PCT/US2006/062710 (corresponding U.S. Appl. No. 11/321,046), 8 pages.
International Preliminary Report on Patentability dated Jul. 10, 2008, issued in International Application No. PCT/US2006/062673 (corresponding U.S. Appl. No. 11/321,064), 8 pages.
International Search Report and Written Opinion for PCT/US2006/062707, mailed Sep. 24, 2007, (9 pages).

* cited by examiner

ESTIMATING AD QUALITY FROM OBSERVED USER BEHAVIOR

BACKGROUND

1. Field of the Invention

Implementations described herein relate generally to on-line advertisements and, more particularly, to estimating qualities of on-line advertisements using observed user behavior.

2. Description of Related Art

On-line advertising systems host advertisements that may advertise various services and/or products. Such advertisements may be presented to users accessing documents hosted by the advertising system. An advertisement may include a "creative," which includes text, graphics and/or images associated with the advertised service and/or product. The advertisement may further include a link to an ad "landing document" which contains further details about the advertised service(s) and/or product(s). When a particular creative appears to be of interest to a user, the user may select (or click) the creative, and the associated link causes a user's web browser to visit the "landing document" associated with the creative and link. This selection of an advertising creative and associated link by a user is referred to hereinafter as a "click."

On-line advertising systems often track ad clicks for billing and other purposes. One non-billing purpose for tracking ad clicks is to attempt to ascertain advertisement quality. The click through rate (CTR) is a measure used to determine advertisement quality. CTR represents the fraction of times a given ad gets "clicked" on when an advertisement creative is presented to users. The CTR of an advertisement, however, is an imperfect measure of advertisement quality since it focuses on the advertisement creative rather than the object of that advertisement, which is the landing document. A user needs to click on an advertisement in order to determine if an advertisement is good or bad and, therefore, the occurrence/non-occurrence of a click is insufficient to determine the quality of an advertisement. Some advertisements receive many clicks because they have a good creative, but the landing document is completely unsatisfying, or irrelevant, to the user. Other advertisements receive very few clicks (e.g., due to the advertisement creative being poor), but every click leads to a satisfied user. Existing determinations of CTR associated with on-line advertisements, thus, provide imperfect measures of advertisement quality.

SUMMARY

According to one aspect, a method may include obtaining ratings associated with a first set of advertisements hosted by one or more servers, where the ratings indicate a quality of the first set of advertisements. The method may further include observing multiple different first user actions associated with user selection of advertisements of the first set of advertisements and deriving a statistical model using the observed first user actions and the obtained ratings. The method may also include observing second user actions associated with user selection of a second advertisement hosted by the one or more servers and using the statistical model and the second user actions to estimate a quality of the second advertisement.

According to another aspect, a method may include observing first user behavior associated with user selection of a first advertisement hosted by a server, where the first observed user behavior includes user behavior other than, or in addition to, a click through rate (CTR). The method may further include estimating a quality of the first advertisement based on the observed first user behavior.

According to a further aspect, a method may include observing multiple measurable user actions associated with user selections of first advertisements hosted by one or more servers and correlating known qualities associated with the first advertisements with certain ones of the multiple measurable user actions. The method may further include observing the presence of the certain ones of the multiple measurable user actions associated with user selection of a second advertisement and estimating a quality of the second advertisement based on the presence of the certain ones of the multiple measurable user actions.

According to an additional aspect, a method may include logging user actions associated with user selection of a group of advertisements, where the group of advertisements is associated with quality ratings and where the user actions include user actions other than, or in addition to, a click through rate (CTR). The method may further include generating a statistical model using the logged user actions and the quality ratings and estimating qualities of advertisements not included in the group of advertisements using the statistical model.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Systems and methods consistent with aspects of the invention may use multiple observations of user behavior (e.g., real-time observations or observations from recorded user logs) associated with user selection of on-line advertisements to more accurately estimate advertisement quality as compared to conventional determinations of quality based solely on CTR. Quality ratings associated with known rated advertisements, and corresponding measured observed user behavior associated with selections (e.g., "clicks") of those known rated advertisements, may be used to construct a statistical model. The statistical model may subsequently be used to estimate qualities associated with unrated advertisements based on observed user behavior associated with selections of the unrated advertisements. The statistical model may, thus, given a set of observations of user behavior associated with the selection of an advertisement, estimate the likelihood of the user being satisfied with the selected advertisement.

A "document," as the term is used herein, is to be broadly interpreted to include any machine-readable and machine-storable work product. A document may include, for example, an e-mail, a web page or site, a business listing, a file, a combination of files, one or more files with embedded links to other files, a news group posting, a blog, an on-line advertisement, etc. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
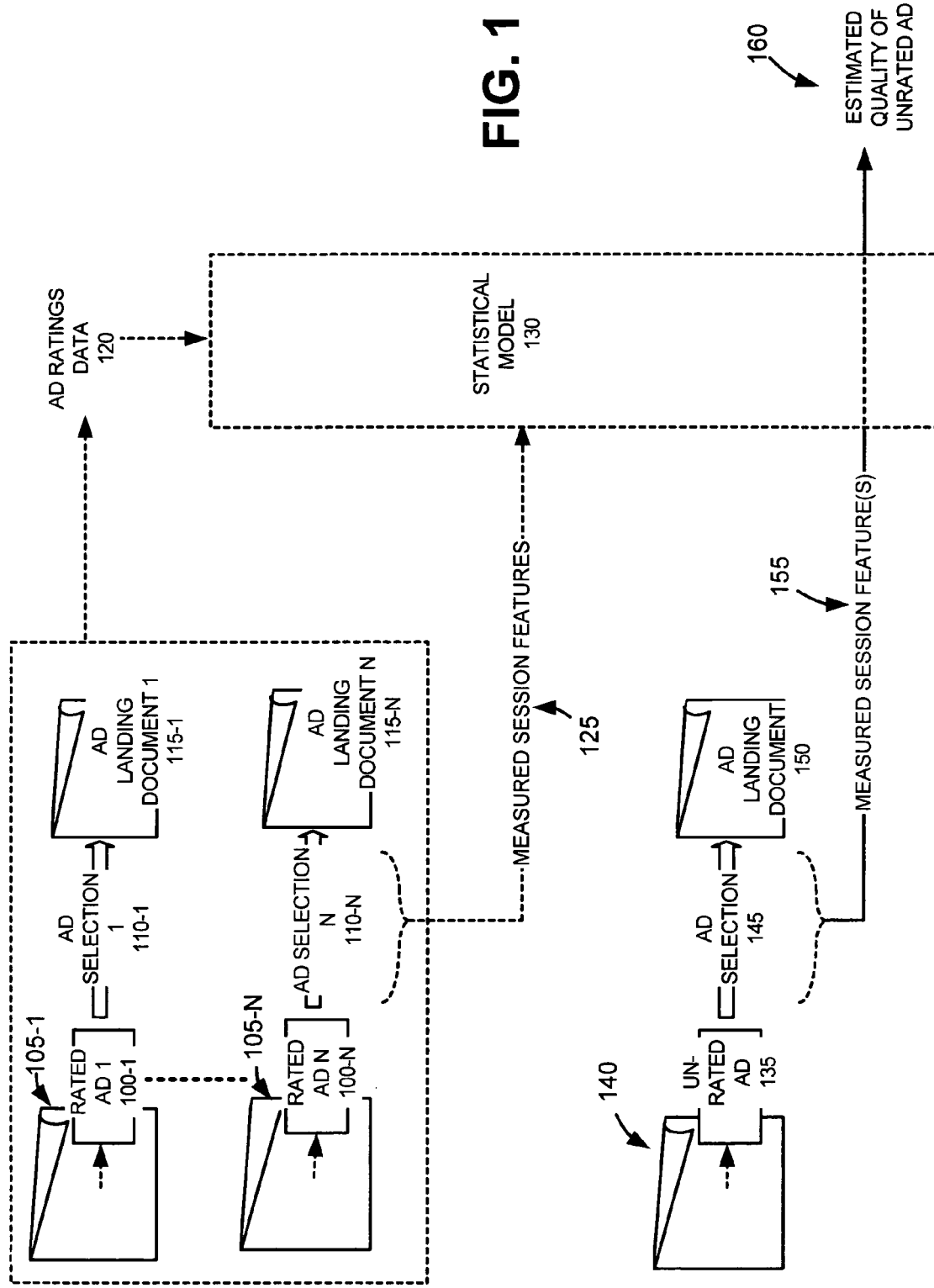
FIG. 1 is an exemplary diagram of an overview of an implementation in which observed user behavior and known quality ratings associated with a set of advertisements are used to construct a statistical model that can be used for estimating advertisement quality.

FIG. 1 illustrates an exemplary overview of an implementation in which observed user behavior is used to estimate a quality of an on-line advertisement. As shown in FIG. 1, each one of multiple rated advertisements 100-1 through 100-N (collectively referred to herein as ad 100) may be associated with a corresponding document 105-1 through 105-N (collectively referred to herein as document 105). Each document 105 may include a set of search results resulting from a search executed by a search engine based on a search query provided by a user and further may include one or more advertisements in addition to a rated ad 100. Each advertisement 100 may be associated with ratings data 120 provided by human raters who have rated a quality of each rated advertisement 100. Each document 105 may be hosted by a server in a network, and when each document 105 is accessed by a user, an associated advertisement 100 may be provided to the user automatically (e.g., a pop-up ad), or the ad 100 may be included in the accessed document 105. Each advertisement 100 may advertise various products or services.

In response to receipt of an advertisement 100, the receiving user may, based on the "creative" displayed on the advertisement, select 110 the advertisement (e.g., "click" on the displayed advertisement using a mouse). After ad selection 110, an ad landing document 115 may be provided to the selecting user by a server hosting the advertisement using a link embedded in ad 100. The ad landing document 115 may provide details of the product(s) and/or service(s) advertised in the corresponding advertisement 100.

Before, during and/or after each ad selection 110 by a user, session features 125 associated with each ad selection 110 during a "session" may be measured in real-time or logged in memory. A session may include a group of user actions that occur without a break of longer than a specified period of time (e.g., a group of user actions that occur without a break of longer than three hours).

The measured session features 125 can include any type of observed user behavior or actions. For example, session features 125 may include a duration of the ad selection 110 (e.g., a duration of the "click" upon the ad 100), the number of selections of other advertisements before and/or after a given ad selection, the number of selections of search results before and/or after a given ad selection, the number of selections on other types of results (e.g., images, news, products, etc.) before and/or after a given ad selection, a number of document views (e.g., page views) before and/or after a given ad selection (e.g., page views of search results before and/or after the ad selection), the number of search queries before and/or after a given ad selection, the number of queries associated with a user session that show advertisements, the number of repeat selections on a same given advertisement, or an indication of whether a given ad selection was the last selection in a session, the last ad selection in a session, the last selection for a given search query, or the last ad selection for a given search query. Other types of observed user behavior associated with ad selection, not described above, may be used consistent with aspects of the invention.

Using the measured session features 125 and ad ratings data 120, associated with each ad selection 110 of a corresponding rated advertisement 100, a statistical model 130 may be constructed (as further described below). The statistical model may include a probability model derived using existing statistical techniques. Such techniques may include, for example, logistic regression, regression trees, boosted stumps, or other existing statistical modeling techniques. Statistical model 130 may determine the likelihood that a given advertisement 100 is good or bad given measured session features associated with a user selection of the advertisement 100 (e.g., P(good ad|ad selection)=f(session features)).

Subsequent to construction of statistical model 130, a quality of an unrated advertisement selected by a user may be estimated. An unrated ad 135, associated with a document 140, may be hosted by a server in a network and may be provided to an accessing user. Session features 155 associated with user selection 145 of unrated ad 135 may be measured, and the measurements may be provided as inputs into statistical model 130. Statistical model 130 may determine a likelihood that the unrated ad 135 is a good ad, given the measured session features, and may generate an estimated quality 160 of the unrated ad 135. The estimated quality 160 of the unrated ad 135 may be used for various purposes, such as, for example, ranking multiple advertisements among one another, determining which advertisements to present or to promote (e.g., differentially alter ad placement on a given document), etc.

Exemplary Network Configuration

Figure 2:
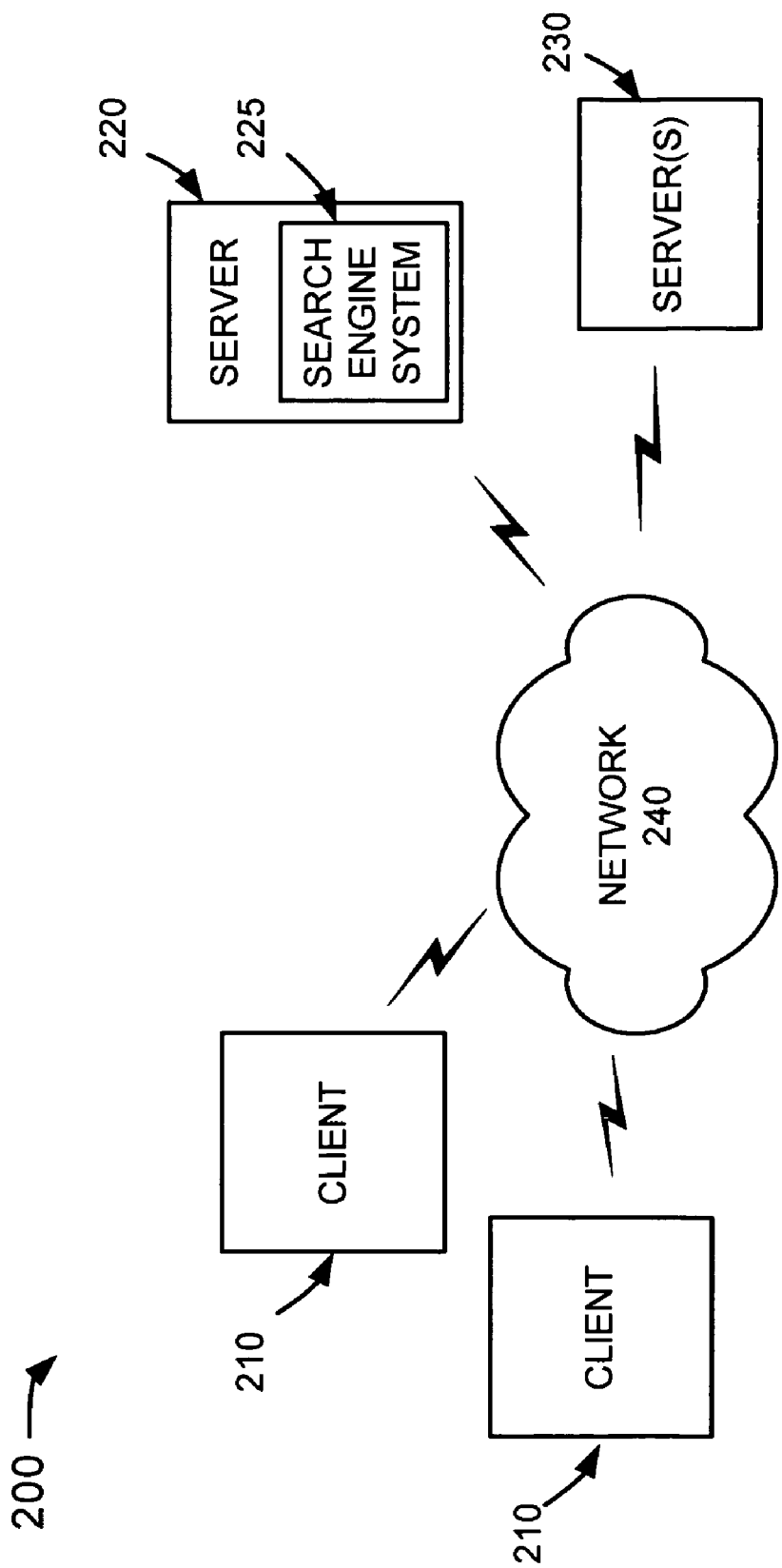
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform some functions of a server and a server may perform some functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. One or more users may be associated with each client 210. Servers 220 and 230 may include server entities that access, fetch, aggregate, process, search, and/or maintain documents in a manner consistent with the principles of the invention. Clients 210 and servers 220 and 230 may connect to network 240 via wired, wireless, and/or optical connections.

In an implementation consistent with the principles of the invention, server 220 may include a search engine system 225 usable by users at clients 210. Server 220 may implement a data aggregation service by crawling a corpus of documents (e.g., web documents), indexing the documents, and storing information associated with the documents in a repository of documents. The data aggregation service may be implemented in other ways, such as by agreement with the operator(s) of data server(s) 230 to distribute their hosted documents via the data aggregation service. In some implementations, server 220 may host advertisements (e.g., creatives, ad landing documents) that can be provided to users at clients 210. Search engine system 225 may execute a query, received from a user at a client 210, on the corpus of documents stored in the repository of documents, and may provide a set of search results to the user that are relevant to the executed query. In addition to the set of search results, server 220 may provide one or more advertising creatives, associated with results of the executed search, to the user at client 210.

Server(s) 230 may store or maintain documents that may be crawled by server 220. Such documents may include data related to published news stories, products, images, user groups, geographic areas, or any other type of data. For example, server(s) 230 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites. Server(s) 230 may further host advertisements, such as ad creatives and ad landing documents.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Exemplary Client/Server Architecture

Figure 3:
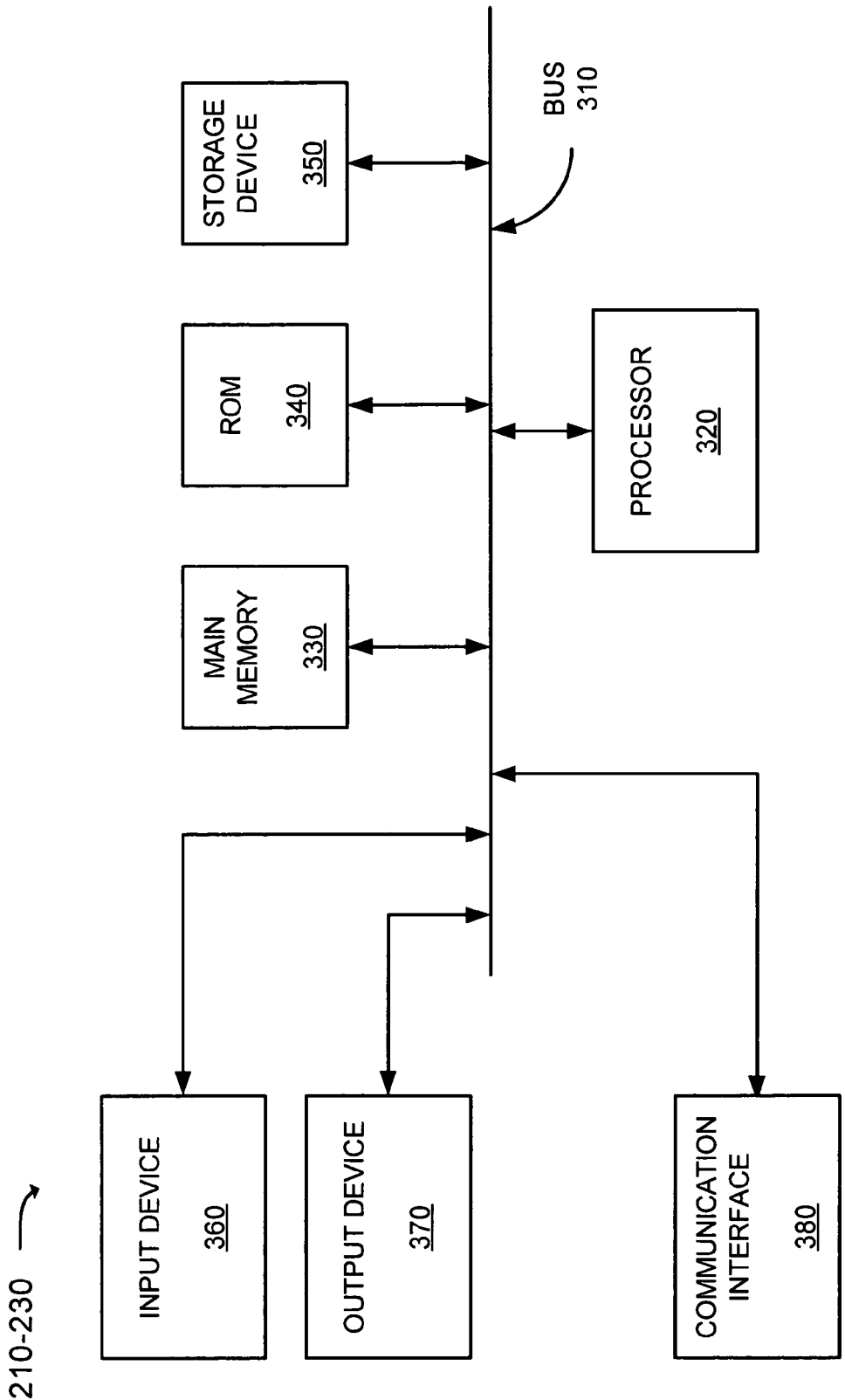
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 4:
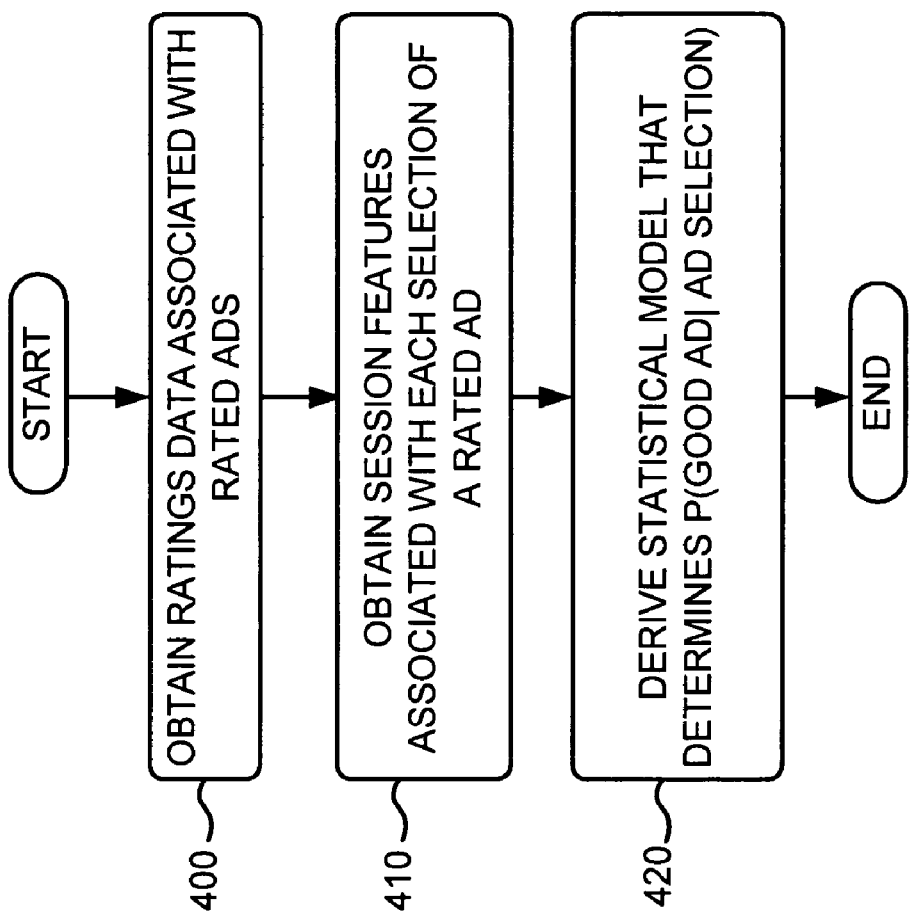
FIG. 4 is a flowchart of an exemplary process for constructing a model of user behavior associated with the selections of multiple on-line advertisements according to an implementation consistent with the principles of the invention.

Exemplary Process for Constructing a Statistical Model of User Behavior Associated with Ad Selections FIG. 4 is a flowchart of an exemplary process for constructing a statistical model of user behavior associated with the selections of multiple on-line advertisements. As one skilled in the art will appreciate, the process exemplified by FIG. 4 can be implemented in software and stored on a computer-readable memory, such as main memory 330, ROM 340, or storage device 350 of server 220, 230 or a client 210, as appropriate.

The exemplary process may begin with obtaining ratings data associated with rated advertisements (block 400). The ratings data may include human generated data that rates the quality of each of the rated ads (e.g., relative to the query issued). Session features associated with each selection of a rated advertisement may then be obtained (block 410). The session features may be obtained in real-time by observing actual user behavior during a given user session, that occurred before, during and after the presentation of each ad impression to a user, or may be obtained from recorded logs of session features (i.e., user behavior and actions) that were stored in a database before, during and/or after the presentation of each ad impression to a user. The obtained session features 125 can include any type of observed user behavior. Each of the session features 125 may correspond to an indirect measurement of user satisfaction with a given advertisement. Certain ones of the session features 125 may be factors in determining how different users have different values for other ones of the session features 125 (e.g., users with dial-up connections may have longer ad selection durations than users who have high speed Internet connections).

Session features 125 may include, but are not limited to, a duration of an ad selection (e.g., a duration of the "click" upon the advertisement), a number of selections of other advertisements before and/or after a given ad selection, a number of selections of search results before and/or after a given ad selection, a number of selections of other results before and/or after a given ad selection, a number of document views (e.g., page views) before and/or after a given ad selection, a number of search queries before and/or after a given ad selection, a number of search queries associated with a user session that show advertisements, a number of repeat selections on a same given advertisement, or an indication of whether a given ad selection was the last selection in a session, the last ad selection in a session, a last selection for a given search query, or the last ad selection for a given search query. FIGS. 5-12 below depict various exemplary types of user behavior, consistent with aspects of the invention, that may be measured as session features.

Figure 5:
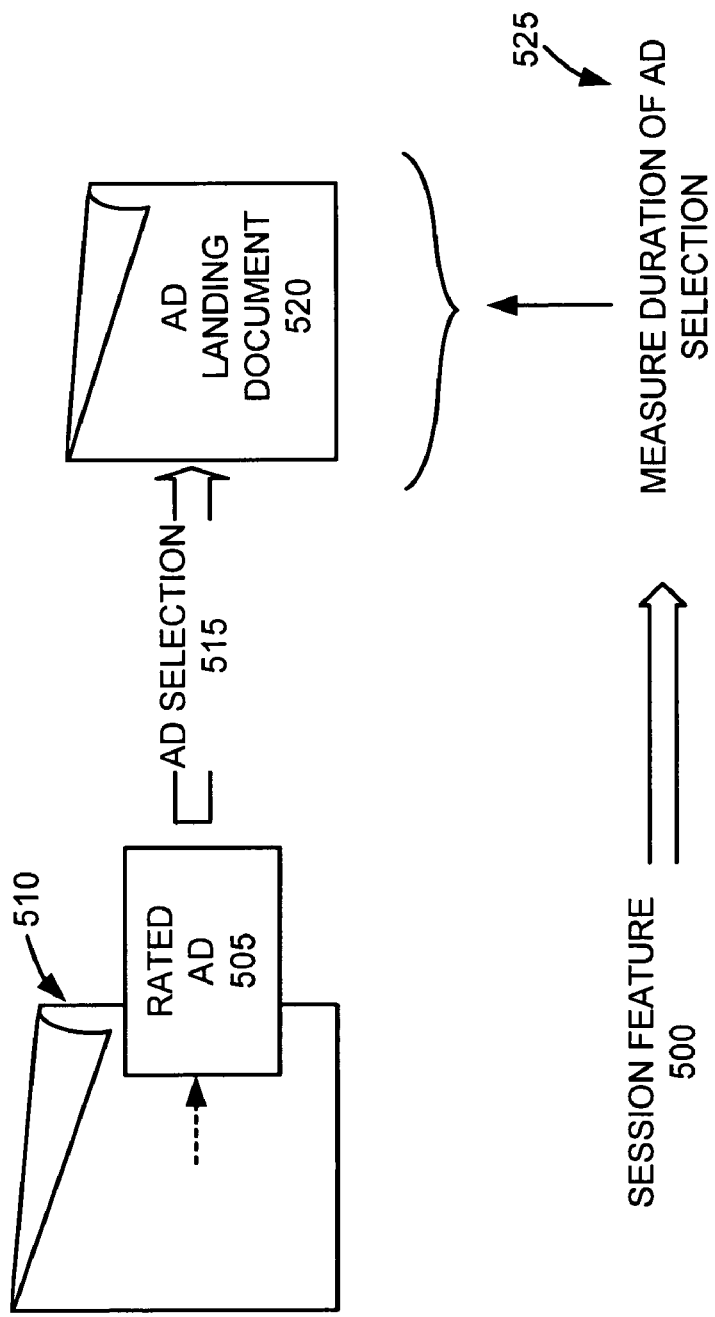
FIGS. 5-12 illustrate various exemplary session features, corresponding to observed user actions, that can be used for constructing a statistical model for estimating advertisement quality.

FIG. 5 illustrates the measurement of a duration of an ad selection as a session feature 500. As shown in FIG. 5, an ad 505, that is associated with a document 510, may be provided to a user. In response to receipt of ad 505, the user may select 515 ad 505, and an ad landing document 520 may be provided to the user. A duration 525 of the ad selection (e.g., the period of time from selection of the advertisement until a next user action) may be measured as a session feature 500.

Figure 6:
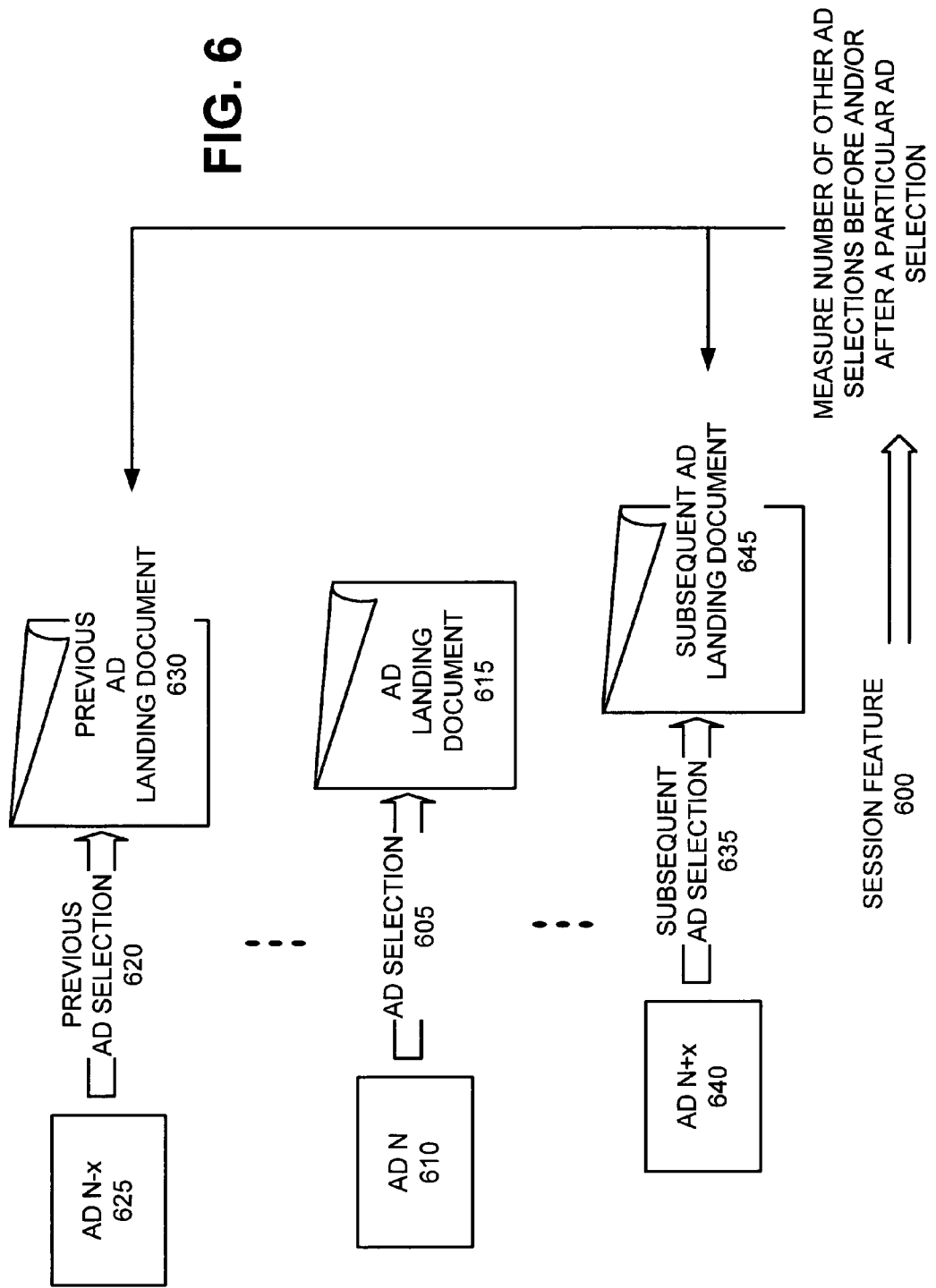

FIG. 6 illustrates the measurement of a number of other ad selections before and/or after a particular ad selection as a session feature 600. Given a particular selection 605 of an ad N 610, and provision of an ad landing document 615 in response to the ad selection 605, a number of one or more previous ad selections 620 of ads N−x 625, corresponding to provisions of previous ad landing documents 630, may be measured. Additionally, or alternatively, given a particular selection 605 of an ad N 610, a number of one or more subsequent ad selections 635 of ads N+x 640, corresponding to provisions of subsequent ad landing documents 645, may be measured. The number of other ad selections before and/or after a particular ad selection may be measured as a session feature 600.

Figure 7:
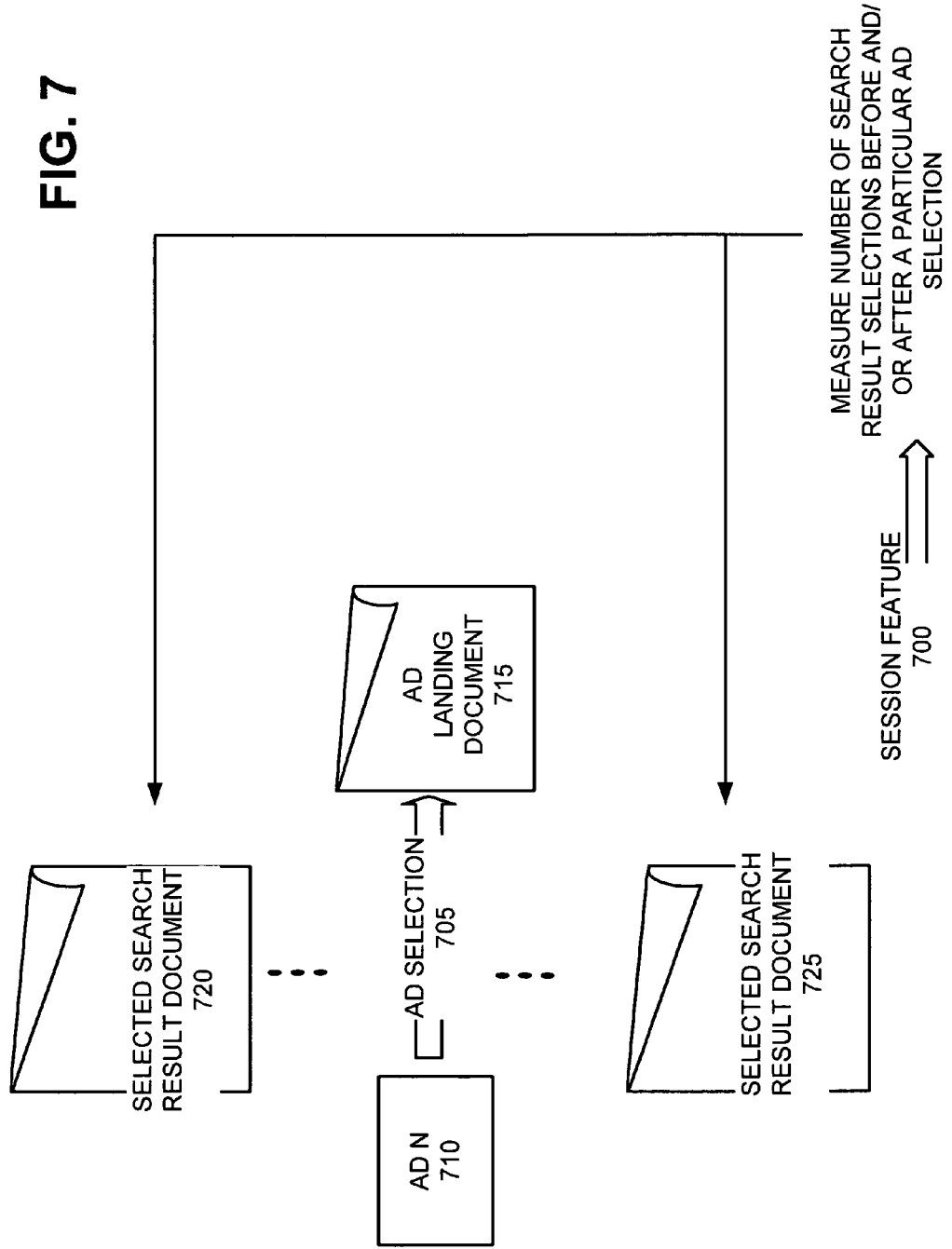

FIG. 7 illustrates the measurement of a number of search result selections before and/or after a particular ad selection as a session feature 700. Given a particular selection 705 of an ad N 710, and provision of an ad landing document 715 in response to the ad selection 705, a number of search result documents 720 viewed by the user before the ad selection 705 may be measured as a session feature 700. The search result documents may be provided to the user based on the execution of a search using a search query issued by the user. Additionally, or alternatively, a number of search result documents 725 viewed by the user after the ad selection 705 may be measured as a session feature 700.

Figure 8:
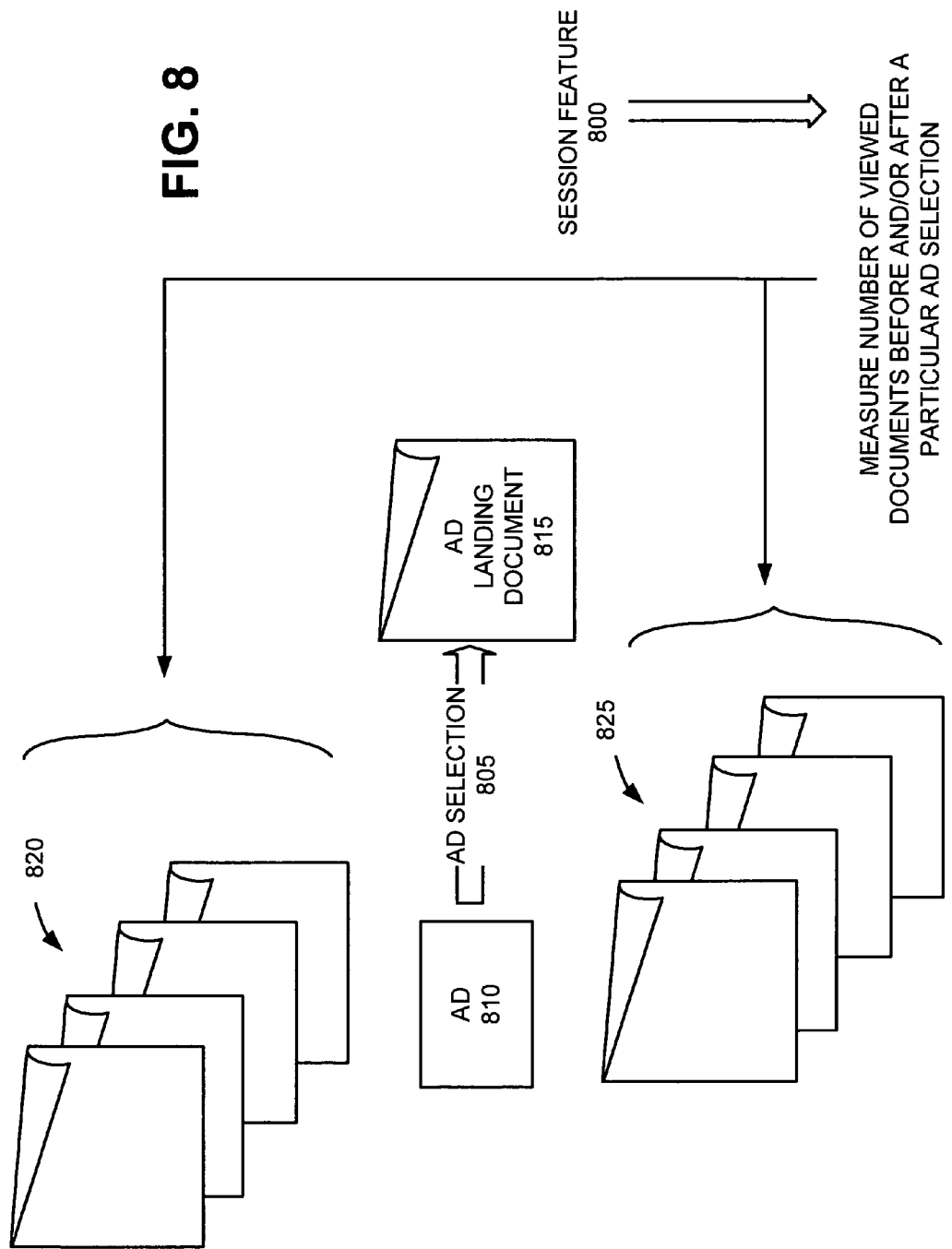

FIG. 8 illustrates the measurement of a number of documents viewed by a user before and/or after a particular selection as a session feature 800. Given a particular selection 805 of an ad 810, and provision of an ad landing document 815 in response to the ad selection 805, a number of documents 820 viewed by a user (e.g., page views) before the ad selection 805 may be measured as a session feature 800. Additionally, or alternatively, a number of documents 825 viewed by a user (e.g., page views) after the ad selection 805 may be measured as a session feature 800.

Figure 9:
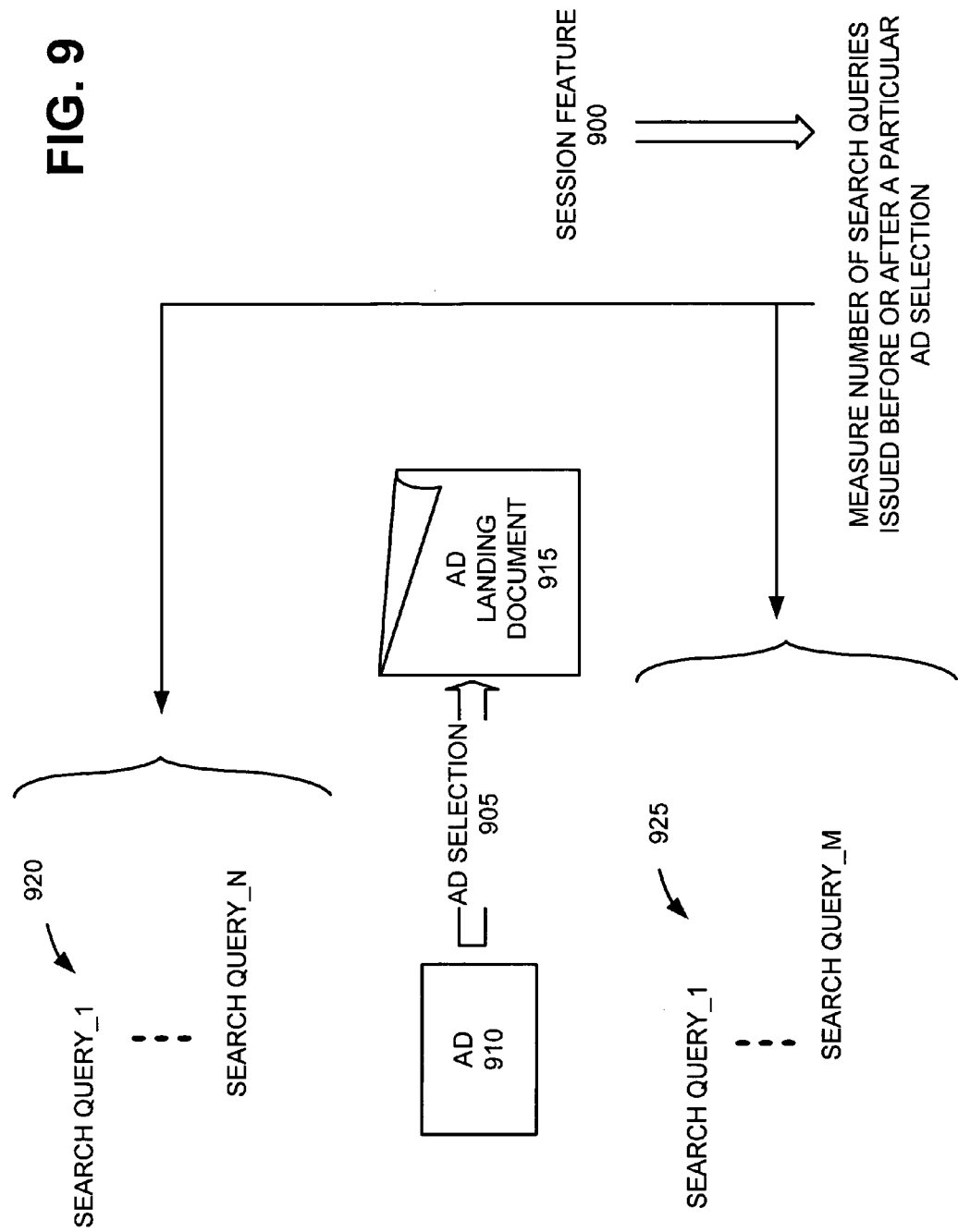

FIG. 9 illustrates the measurement of a number of search queries issued by a user before and/or after a particular ad selection as a session feature 900. Given a particular selection 905 of an ad 910, and provision of an ad landing document 915 in response to the ad selection 905, a number of search queries 920 issued by a user before the ad selection 905 may be measured as a session feature 900. Additionally, or alternatively, a number of search queries 925 issued by a user after the ad selection 905 may be measured as a session feature 900.

Figure 10:
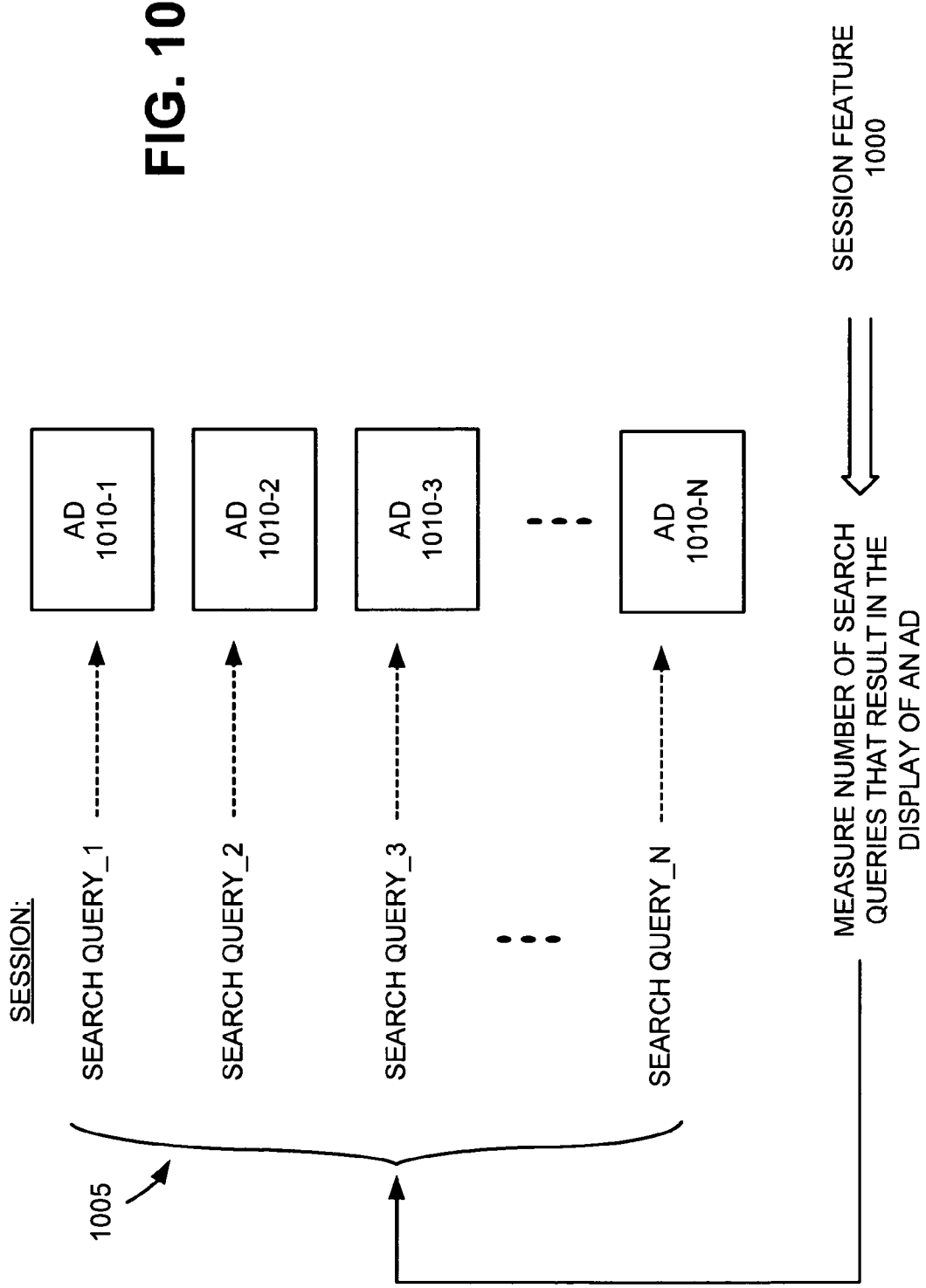

FIG. 10 illustrates the measurement of a number of search queries, in a session that includes a particular ad selection, that results in the display of an advertisement as a session feature 1000. Given a session that includes a particular ad selection, a number of search queries 1005 may be measured that result in the display of a corresponding ad 1010-1 through 1010-N. The number of search queries may be measured as a session feature 1000. The number of search queries 1005 resulting in the display of an advertisement may indicate the commercial nature of a given user session.

Figure 11:
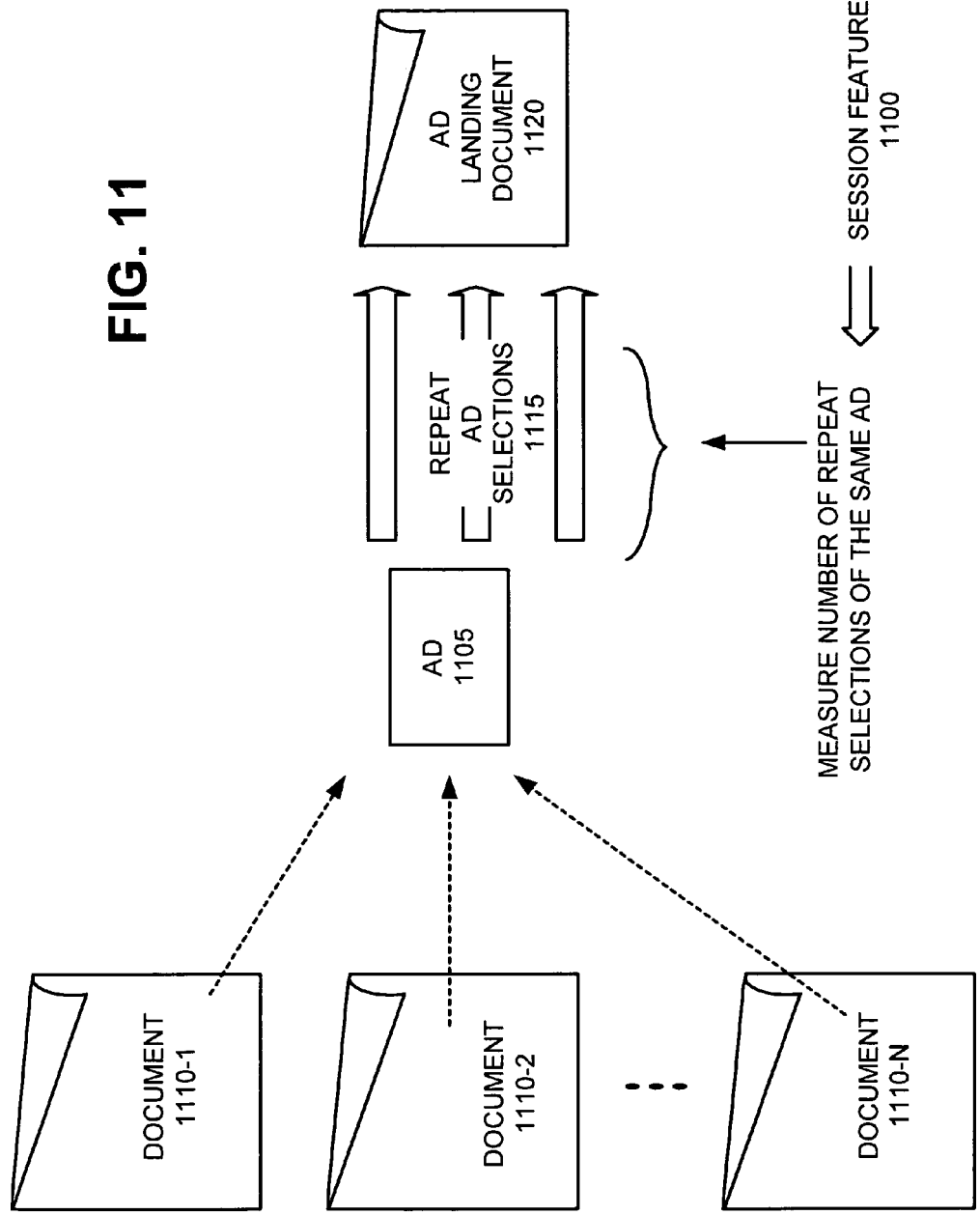

FIG. 11 illustrates the measurement of a number of repeat selections of the same advertisement by a user as a session feature 1100. As shown in FIG. 11, an ad 1105, that may be associated with multiple documents 1110-1 through 1110-N, may be provided to a user one or more times. In response to each receipt of the ad 1105, the user may select 1115 ad 1105, and an ad landing document 1120 may be provided to the user for each of the repeated user selections. The number of repeat selections of the same advertisement by the user may be measured as a session feature 1100.

Figure 12:
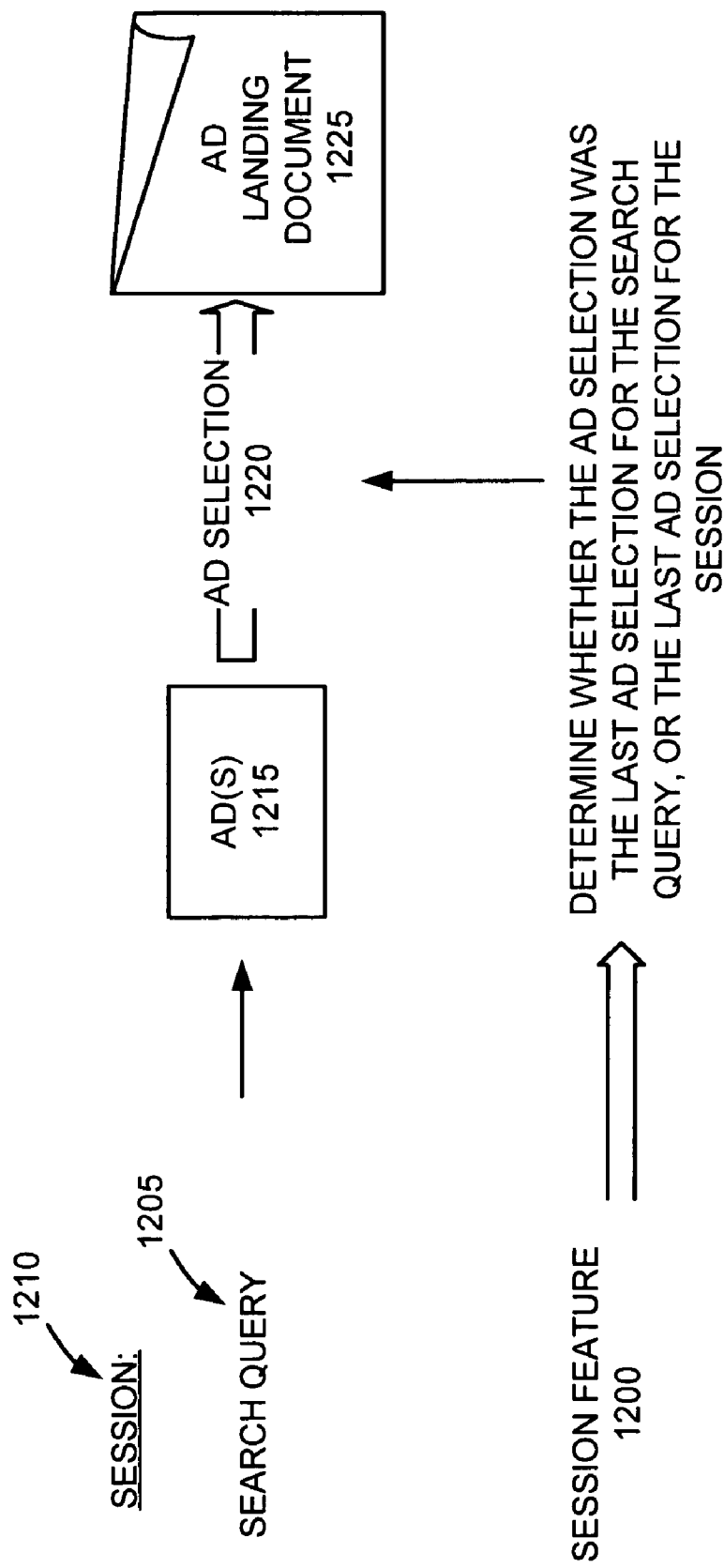

FIG. 12 illustrates the determination of whether an ad selection is the last ad selection for a given search query, or whether the ad selection is the last ad selection for a user session as a session feature 1200. As shown in FIG. 12, a user may issue a search query 1205 during a given session 1210, and one or more ads 1215 may be provided to the user subsequent to issuance of search query 1205. In response to each receipt of the ad(s) 1215, the user may select 1220 ad 1215, and an ad landing document 1225 may be provided to the user. A determination may be made whether the ad selection 1220 is the last ad selection for search query 1205. Thus, if multiple ads were selected by the user that issued search query 1205, then only the last ad selection for search query 1205 may be identified. A determination may also be made whether the ad selection 1220 was the last ad selection for session 1210. Therefore, if multiple ad selections have been made by the user during a given session, then only the last ad selection for the session may be identified.

Other types of user behavior, not shown in FIGS. 5-12, may be used as session features consistent with principles of the invention. The following lists numerous examples of other exemplary session features:

1) instead of an ad selection duration, a ratio of a given ad selection duration relative to an average ad selection duration for a given user may be used as a session feature. A given user may read faster than other users and, thus, may stay on a given advertisement a different amount of time than other users;

2) a ratio of a given ad selection duration relative to an average ad selection duration permits an identification of which ads that a particular user stays on longer than normal;

3) a ratio of a given ad selection duration relative to all selections by a user (e.g., search result selections or ad selections);
4) how many times a user selects a given ad in a given session. A user may visit a given ad, find it interesting, go visit other ads and/or search results, and then come back to the given ad because it was the most interesting.
5) a duration of time, from an ad result selection, until the user issues another search query. The shorter the duration of time, the more likely that the user is less-satisfied with the ad result reached from the selection (i.e., the user feels a need to refine the query sooner).
6) a ratio of the time, from a given ad result selection until the user issues another search query, as compared to all other times from ad result selections until the user issued another search query.
7) time spent, given an ad result selection, on viewing other results for the search query, but not on the given ad result. This session feature provides an indication of how good the results were overall for this query.
8) a ratio of a given ad selection duration relative to all other ad selection durations. If a user spends longer on a given ad relative to the time spent, on average, on other ads, then the user is likely to be more satisfied with the ad.
9) how many searches (i.e., a unique issued search query) that occur in a given session prior to a given search result or ad selection;
10) how many searches that occur in a given session after a given search result or ad selection. The more searches there are after a given query, the less likely that the user is satisfied with the result of a given selection;
11) rather than searches, how many result page views that occur for a given search query before a given selection. This can be computed within the query (i.e., just for a unique query), or for the entire session;
12) rather than searches, how many search result page views that occur for a given search query after this selection. This can be computed within the query (i.e., just for the unique query), or for the entire session. More page views after a selection may indicate a lack of satisfaction;
13) the total number of page views that occur in the session;
14) the number of page views in the session that show ads. This gives some notion as to the commerciality of the session. The more commercial the session, the more likely that the user will be happy with an ad result;
15) the ratio of the number of page views in the session that show ads to the total number of page views that occur in the session. A high ratio indicates that queries a user was submitting were highly commercial;
16) total number of ad impressions shown in the session. This is another measure of the commerciality of the session;
17) average number of ads shown per query that shows ads, another measure of the commerciality of the session;
18) query scan time—how long from when the user sees the results of a query to when the user does something else (click on an ad, search result, next page, new query, etc.). The length of time could be indicative of how good the page is overall—the longer, the less good the page (user has to read more of the page to find something worth clicking on);
19) ratio between a given query scan time and all other query scan times;
20) total number of selections (e.g., clicks) that occured on a given search. These selections include all types of selections (e.g., search, onebox, ads) rather than just ad selections;
21) total number of selections that occurred on a search before a given ad selection;
22) total number of selections that occurred on a search after a given ad selection;
23) total number of ad selections that occurred on a search. May need to be correlated with the number of ads on the page;
24) total number of ad selections that occurred on a search before a given ad selection;
25) total number of ad selections that occurred on a search after a given ad selection;
26) total number of ad selections, that occurred on a search, whose ad positions on a document were located above a position of a given ad on the document;
27) total number of ad selections, that occurred on a search, whose ad positions on a document were located below a position of a given ad on the document;
28) total number of ad selections that occurred on a search that are not on a given ad;
29) total number of search result selections that occurred on a search;
30) total number of search selections that occurred on a search before a given ad selection;
31) total number of search result selections that occurred on a search after a given ad selection;
32) total number of search result selections of a long duration that occurred in the session;
33) total number of search result selections of a short duration that occurred in the session;
34) total number of search result selections, that are last, that occurred in the session. A given user may end a session by clicking on a search result, with no subsequent actions, or the user may end a session in some other fashion (e.g., ad result click; issuing a query and not clicking, etc.);
35) total number of non-search result and non-ad selections that occurred on a search;
36) an indication of whether there was a conversion from this ad selection;
37) an indication of the connection speed of the user (e.g., dialup, cable, DSL);
38) an indication of what country the user is located in. Different cultures might lead to users reacting differently to the same ad or having different cultural reactions or staying on sites differently;
39) an indication of what region of the world (e.g., APAC—asia pacific) that the user is located in;
40) was the keyword for a given ad an exact match to the search query (i.e., has all of the same terms as the query) or is missing one word, more than one word, or has rewrite terms. Often, the quality of an ad can vary (the more exact the match, the higher the quality) and keyword matching can be a reasonable way to segment ads, and predict whether an ad is good or bad separately for different match types.
41) an indication of an estimated click through rate (CTR) for a given ad;
42) what cost per click (CPC) did the advertiser pay for a given ad selection? The likelihood that an ad is good may depend on how much the advertiser paid (more is higher quality);
43) what CPC was the advertiser willing to pay? In ad auctioning, advertiser bidding may be used to set ad ranking and the ad/advertiser ranked lower than a given ad/advertiser sets the price that is actually paid by the next higher ranked ad/advertiser;

44) effective CPC*predicted CTR; or 45) bid CPC*predicted CTR.

The above describes numerous examples of session features that may be used for the statistical model. However, one skilled in the art will recognize that other session features may be used, alternatively, or in conjunction with any of the above-described session features.

Returning to FIG. 4, a statistical model may then be derived that determines the probability that each selected ad is a good quality ad given the measured session features associated with the ad selection (block 420). An existing statistical technique, such as, for example, logistic regression may be used to derive the statistical model consistent with principles of the invention. Regression involves finding a function that relates an outcome variable (dependent variable y) to one or more predictors (independent variables $x_1$, $x_2$, etc.). Simple linear regression assumes a function of the form:

$$y = c_0 + c_1 * x_1 + c_2 * x_2 + \ldots \quad \text{Eqn. (1)}$$

and finds the values of $c_0$, $c_1$, $c_2$, etc. ($c_0$ is called the "intercept" or "constant term"). In the context of the present invention, each predictor variable $x_1$, $x_2$, $x_3$, etc. corresponds to a different session feature measured during ad selection. Logistic regression is a variation of ordinary regression, useful when the observed outcome is restricted to two values, which usually represent the occurrence or non-occurrence of some outcome event, (usually coded as 1 or 0, respectively), such as a good advertisement or a bad advertisement in the context of the present invention.

Logistic regression produces a formula that predicts the probability of the occurrence as a function of the independent predictor variables. Logistic regression fits a special s-shaped curve by taking the linear regression (Eqn. (1) above), which could produce any y-value between minus infinity and plus infinity, and transforming it with the function:

$$P = \exp(y)/(1 + \exp(y)) \quad \text{Eqn. (2)}$$

which produces P-values between 0 (as y approaches minus infinity) and 1 (as y approaches plus infinity). Substituting Eqn. (1) into Eqn. (2), the probability of a good advertisement, thus, becomes the following:

$$P(\text{good } ad \mid ad \text{ selection}) = f_g(\text{session features } x_1, x_2, x_3 \ldots) \quad \text{Eqn. (3)}$$

$$= \frac{e^{(c_{g0} + c_{g1} * x_1 + c_{g2} * x_2 + \ldots)}}{1 + e^{(c_{g0} + c_{g1} * x_1 + c_{g2} * x_2 + \ldots)}}$$

where $c_{g0}$ is the constant of the equation, and $c_{gn}$ is the coefficient of the session feature predictor variable $x_n$. The probability of a bad advertisement may, similarly, be determined by the following:

$$P(\text{bad } ad \mid ad \text{ selection}) = f_b(\text{session features } x_1, x_2, x_3 \ldots) \quad \text{Eqn. (4)}$$

$$= \left( \frac{e^{(c_{b0} + c_{b1} * x_1 + c_{b2} * x_2 + \ldots)}}{1 + e^{(c_{b0} + c_{b1} * x_1 + c_{b2} * x_2 + \ldots)}} \right)$$

where $c_{b0}$ is the constant of the equation, and $c_{bn}$ is the coefficient of the session feature predictor variables $x_n$.

A fit of the statistical model may be tested to determine which session features are correlated with good or bad quality advertisements. If a logistic regression technique is used to determine the statistical model, the goal of logistic regression is to correctly predict the outcome for individual cases using the most parsimonious model. To accomplish this goal, a model is created that includes all predictor variables (e.g., session features) that are useful in predicting the outcome of the dependent y variable. To construct the statistical model, logistic regression can test the fit of the model after each coefficient ($c_n$) is added or deleted, called stepwise regression. For example, backward stepwise regression may be used, where model construction begins with a full or saturated model and predictor variables, and their coefficients, are eliminated from the model in an iterative process. The fit of the model is tested after the elimination of each variable to ensure that the model still adequately fits the data. When no more predictor variables can be eliminated from the model, the model construction has been completed. The predictor variables that are left in the model, each corresponding to a measured session feature, identify the session features that are correlated with good or bad advertisements. Logistic regression, thus, can provide knowledge of the relationships and strengths among the different predictor variables. The process by which coefficients, and their corresponding predictor variables, are tested for significance for inclusion or elimination from the model may involve several different known techniques. Such techniques may include the Wald test, the Likelihood-Ratio test, or the Hosmer-Lemshow Goodness of Fit test. These coefficient testing techniques are known in the art and are not further described here. In other implementations, existing techniques of cross validation and independent training may be used instead of techniques of classical estimation and testing of regression coefficients, as described above.

Other existing statistical techniques, instead of, or in addition to logistic regression, may be used to derive a statistical model consistent with principles of the invention. For example, a "stumps" model, using "boosting" techniques may be used to derive the statistical model. As one skilled in the art will recognize, "boosting" is a machine learning technique for building a statistical model by successively improving an otherwise weak statistical model. The basic idea is to repeatedly apply the same algorithm to an entire training data set, but differentially weight the training data at each stage. The weights are such that cases that are well-fit by the model through stage k receive relatively small weights at stage k+1, while cases that are ill-fit by the model through stage k receive relatively large weights at stage k+1.

Stumps are a weak statistical model that can be applied at each stage. A stump is a 2-leaf classification tree consisting of a root node and a binary rule that splits the cases into two mutually exclusive subsets (i.e., the leaf nodes). A rule could take the form "ClickDuration<120 sec" and all cases with ClickDuration satisfying the rule go into one leaf node and those not satisfying the rule go into the other leaf node. Another rule could take the form "AdSelection was the last ad selection" and all cases with AdSelection satisfying the rule go into one leaf node and those not satisfying the rule go into the other leaf node.

Various algorithms can be used to fit the "boosted stump" model including, for example, gradient-based methods. Such algorithms may proceed as follows: given a set of weights, among all possible binary decision rules derived from session features that partition the cases into two leaves, choose that one which minimizes the (weighted) loss function associated with the algorithm. Some examples of loss functions are "Bernoulli loss" corresponding to a maximum likelihood method, and "exponential loss" corresponding to the wellknown ADABoost method. After choosing the best binary decision rule at this stage, the weights may be recomputed and the process may be repeated whereby the best binary rule is chosen which minimizes the new (weighted) loss function. This process may be repeated many times (e.g., several hundred to several thousand) and a resampling technique (such as cross-validation) may be used to define a stopping rule in order to prevent over-fitting.

Boosted stumps have been shown to approximate additive logistic regression models whereby each feature makes an additive nonlinear contribution (on the logistic scale) to the fitted model. The sequence of stumps define the relationship between session features and the probability that an ad is rated "good". The sequence can be expressed by the statistical model:

$$P(\text{good } ad \mid \text{session feature } x) = \frac{e^{(c_0 + c_1 * B1(x) + c_2 * B2(x) + \ldots)}}{1 + e^{(c_0 + c_1 * B1(x) + c_2 * B2(x) + \ldots)}} \quad \text{Eqn. (5)}$$

where $Bk(x)=1$ if session feature x satisfies the kth binary rule, or $Bk(x)=0$ if session feature x does not satisfy the kth binary rule. The coefficients $ck$, $k=1, \ldots$, are a by-product of the algorithm and relate to the odds of a good ad at the kth binary rule. In practice, given session feature x, each binary rule can be evaluated and the corresponding coefficients accumulated to get the predicted probability of a good ad.

Though logistic regression and boosted stumps have been described above as exemplary techniques for constructing a statistical model, one skilled in the art will recognize that other existing statistical techniques, such as, for example, regression trees may be used to derive the statistical model consistent with principles of the invention.

Exemplary Ad Quality Estimation Process

Figure 13:
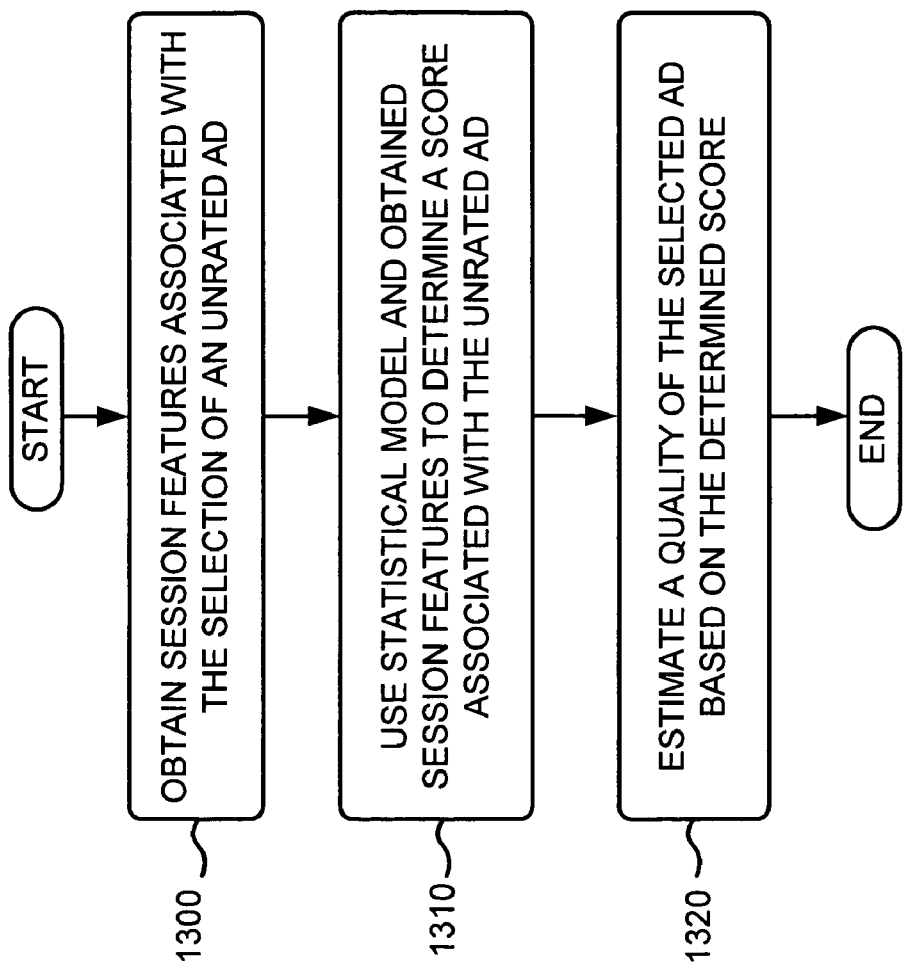
FIG. 13 is a flowchart of an exemplary process for estimating the quality of an advertisement selected by a user according to an implementation consistent with the principles of the invention.

FIG. 13 is a flowchart of an exemplary process for estimating the quality of an advertisement selected by a user according to an implementation consistent with the principles of the invention. As one skilled in the art will appreciate, the process exemplified by FIG. 13 can be implemented in software and stored on a computer-readable memory, such as main memory 330, ROM 340, or storage device 350 of servers 220 or 230 or client 210, as appropriate.

Figure 14:
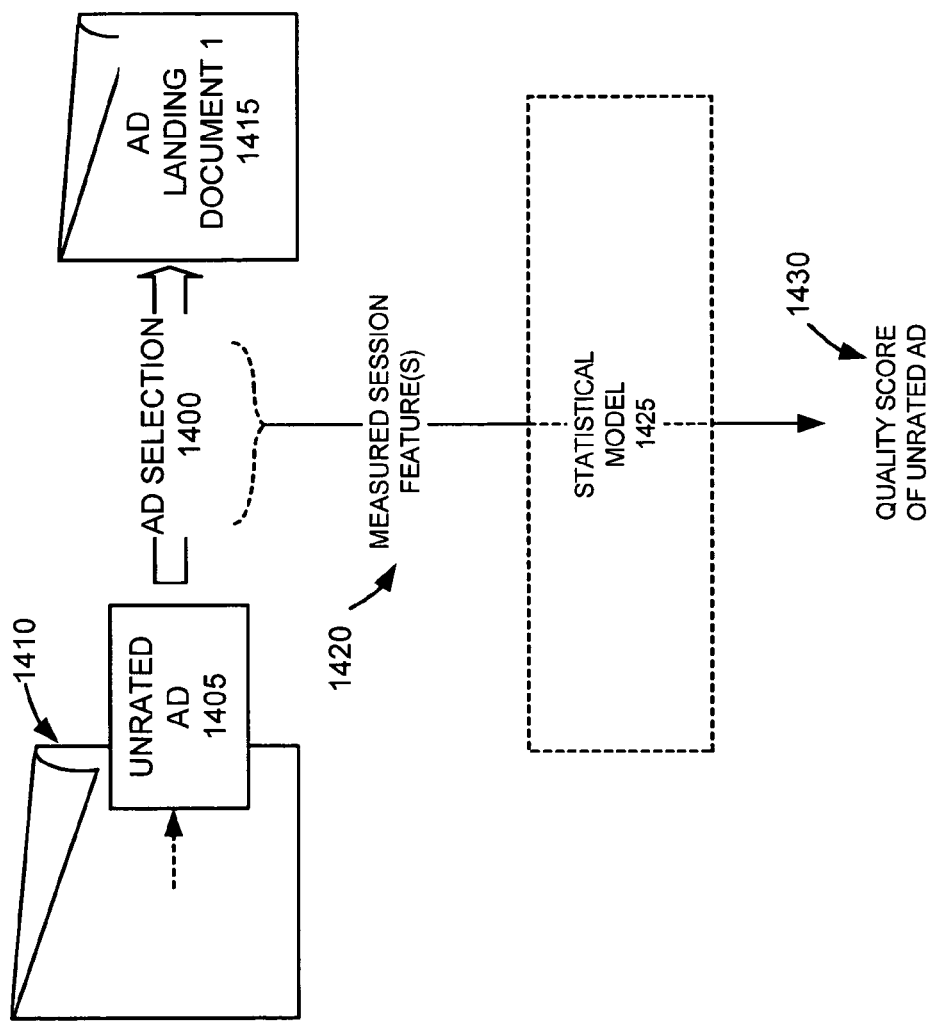
FIG. 14 is a diagram that graphically illustrates the exemplary process of FIG. 13 consistent with an aspect of the invention.

The exemplary process may begin with obtaining session features associated with the selection of unrated ads (block 1300). The session features may be measured in real-time during user ad selection or may be obtained from logs of user behavior associated with ad selection. The unrated ads may not have any human generated quality ratings associated with them, such as the ad ratings used in FIG. 4 above. As shown in FIG. 14, a user may select 1400 an unrated ad 1405 associated with a document 1410 (e.g., a search result document). An ad landing document 1415 may be provided to the user in response to selection of the unrated ad 1405. The obtained session features may include any type of user behavior associated with the selection of an advertisement, such as those described above with respect to block 410 (FIG. 4). As shown in FIG. 14, session features 1420 associated with the selection 1400 of unrated ad 1405 may be measured. The statistical model, derived in block 420 above, and the measured session features may be used to determine a score associated with the unrated ad (block 1310). The statistical model derived in blocks 410 and 420 above may provide a probability function (e.g., Eqns. (3) or (5) above) that indicates the probability of a good ad given measured session features associated with user selection of that ad. Therefore, measured session feature values may be input into Eqns. (3) or (5) to obtain a probability value that the selected ad is good. For example, values for session features $x_1$, $x_2$, $x_3$ and $x_4$ may be input into Eqns. (3) or (5) to obtain a probability value P(good ad|session features $x_1$, $x_2$, $x_3$, $x_4$)=0.4. The probability value P may then be equated with a quality score. For example, the probability value may be equated with a quality score using a linear function of the probability value. As one example, the quality score may be set equal to the probability value P, or to some multiple of the probability value P (e.g., ten times the probability value P). One skilled in the art will recognize, however, that other functional relationships may be used to convert the probability value to a quality score associated with the selected ad. As shown in FIG. 14, the measured session features 1420 may be input into statistical model 1425 and statistical model 1425 may output a quality score 1430 of the unrated ad 1405.

A quality of the selected ad may then be estimated based on the determined score (block 1320). For example, ranges of quality scores may be used to estimate a quality of the selected ad, such as, for example, quality scores between values 0 and X may represent a low quality score, and quality score values between X and X+Y may represent a high quality score. Other methods may be used, consistent with principles of the invention, to estimate a quality of the selected ad based on the determined quality score.

The quality scores, determined in block 1310, may be aggregated, for multiple ad selections by many users, in a data structure as described in co-pending U.S. application Ser. No. 11/321,046, entitled "Predicting Ad Quality," filed on a same date herewith, and incorporated by reference herein in its entirety. Quality predictions, resulting from the aggregated quality scores, may subsequently be used, for example, to filter, rank and/or promote advertisements as described in co-pending U.S. application Ser. No. 11/321,064, entitled "Using Estimated Ad Qualities for Ad Filtering, Ranking and Promotion," filed on a same date herewith, and incorporated by reference herein in its entirety.

CONCLUSION

The foregoing description of preferred embodiments of the present invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 4 and 13, the order of the acts may be modified in other implementations consistent with the principles of the invention. Further, non-dependent acts may be performed in parallel.

In addition to the session features described above, conversion tracking may optionally be used in some implementations to derive a direct calibration between predictive values and user satisfaction. A conversion occurs when a selection of an advertisement leads directly to user behavior (e.g., a user purchase) that the advertiser deems valuable. An advertiser, or a service that hosts the advertisement for the advertiser, may track whether a conversion occurs for each ad selection. For example, if a user selects an advertiser's ad, and then makes an on-line purchase of a product shown on the ad landing document that is provided to the user in response to selection of the ad, then the advertiser, or service that hosts the ad, may note the conversion for that ad selection. The conversion tracking data may be associated with the identified ad selections. A statistical technique, such as, for example, logistic regression, regression trees, boosted stumps, etc., may be used to derive a direct calibration between predictive values and user happiness as measured by conversion.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more processors of a computer system, comprising:
   obtaining, using one or more processors of the computer system, ratings associated with a set of advertisements, where the ratings, which include a measure of quality of the set of advertisements, are received by manual input from human raters;
   logging, using one or more processors of the computer system, first user actions associated with user selection of advertisements of the set of advertisements, the first user actions representing a measure of user satisfaction with regard to the selected advertisements;
   logging, using one or more processors of the computer system, second user actions associated with user selection of an unrated advertisement of a set of unrated advertisements;
   calculating, by one or more processors of the computer system, a probability that the unrated advertisement is of a certain measure of quality based on the logged second user actions and on a probability generated by a probability model that operates based on the logged first user actions and the obtained ratings.

2. The method of claim 1, further comprising:
   testing a fit of the probability model to determine which of the logged first user actions are correlated with advertisements of a certain measure of quality.

3. The method of claim 1, further comprising:
   calculating a quality score associated with the unrated advertisement using the calculated probability; and
   estimating a measure of quality of the unrated advertisement based on the calculated quality score.

4. The method of claim 3, where calculating the quality score associated with the unrated advertisement comprises:
   applying a function to the calculated probability to calculate the quality score.

5. The method of claim 1, where the first user actions or the second user actions each comprise at least one of the following:
   a duration of the selection of the selected rated and unrated advertisements;
   a number of selections of other advertisements before or after the selection of the selected rated and unrated advertisements;
   a number of selections of search results before or after the selection of the selected rated and unrated advertisements;
   a number of selections of other types of results before or after the selection of the selected rated and unrated advertisements;
   a number of document accesses before or after the selection of the selected rated and unrated advertisements;
   a number of search queries before or after the selection of the selected rated and unrated advertisements;
   a number of search queries associated with a user session that shows advertisements;
   a number of repeat selections on a same given advertisement of the selected rated and unrated advertisements; or
   an indication of whether a given advertisement, of the selected rated and unrated advertisements, was a last advertisement selection for a given query or a last selection in a user session.

6. The method of claim 1, where the logged first user actions include a period of time from the selection of the selected advertisements until a next user action; or
   the logged second user actions include a period of time from the selection of the unrated advertisement to a next user action.

7. The method of claim 6, where the period of time from the selection of the selected advertisements until a next user action or the period of time from the selection of the unrated advertisement to a next user action is a measure of user satisfaction with regard to the selected advertisements or the selected unrated advertisement.

8. A method implemented by one or more processors of a computer system, comprising:
   obtaining, using one or more processors of the computer system, first session features associated with user selections of first advertisements hosted by one or more servers, the first session features representing a measure of user satisfaction with the selected first advertisements;
   correlating, using one or more processors of the computer system, known quality ratings, associated with the first advertisements, with the first session features;
   obtaining, using one or more processors of the computer system, second session features associated with user selection of a second unrated advertisement; and
   estimating, using one or more processors of the computer system, a quality rating of the second unrated advertisement based on the obtained second session features and a probability generated by a probability model that operates based on the obtained first session features and the correlated quality ratings.

9. The method of claim 8, where the first session features comprise at least one of the following:
   a duration of the selection of the selected first advertisements;
   a number of selections on other advertisements before or after the selection of the selected first advertisements;
   a number of selections of search results before or after the selection of the selected first advertisements;
   a number of selections of other types of results before or after the selection of the selected first advertisements;
   a number of document accesses before or after the selection of the selected first advertisements;
   a number of search queries before or after the selection of the selected first advertisements;
   a number of search queries associated with a user session that shows advertisements;

a number of repeat selections on a same given advertisement of the selected first advertisements; or an indication of whether a given advertisement, of the selected first advertisements, was a last advertisement selection for a given query or a last selection in a user session.

10. The method of claim 8, further comprising:
testing a fit of the probability model to determine which of the obtained first session features are correlated with advertisements of at least a certain measure of quality.

11. The method of claim 8, further comprising:
predicting a quality rating for another unrated advertisement based on the calculated quality rating of the second unrated advertisement.

12. A system, comprising:
one or more processors to:
  obtain a set of rated: advertisements in response to a user query;
  obtain first session features associated with user selection of advertisements of the set of rated advertisements, the first session features representing a measure of user satisfaction with the selected rated advertisements;
obtain second session features associated with user selection of an unrated advertisement of a set of unrated advertisements; and
determine a probability that the unrated advertisement is of a certain measure of quality based on the second session features and a probability generated by a probability model that is based on the obtained first session features and ratings associated with the selected rated advertisements;
calculate a quality score for the unrated advertisement based on the calculated probability; and
promote, rank, or filter the unrated advertisement based on the calculated score.

13. The system of claim 12, where the first session features or the second session features each comprise at least one of the following:
  a duration of the selection of the selected rated and unrated advertisements;
  a number of selections of other advertisements before or after the selection of the selected rated and unrated advertisements;
  a number of selections of search results before or after the selection of the selected rated and unrated advertisements a given advertisement selection;
  a number of selections of other types of results before or after the selection of the selected rated and unrated advertisements;
  a number of document accesses before or after the selection of the selected rated and unrated advertisements;
  a number of search queries before or after the selection of the selected rated and unrated advertisements;
  a number of search queries associated with a user session that shows advertisements;
  a number of repeat selections on a same given advertisement of the selected rated and unrated advertisements; or
  an indication of whether a given advertisement, of the selected rated and unrated advertisements, was a last advertisement selection for a given query or a last selection in a user session.

14. The system of claim 12, where the one or more processors further are to:
  predict a quality score for another unrated advertisement based on the calculated quality score of the unrated advertisement.

* * * * *

UNITED STATES PATENT AND TRADEMARK OFFICE
CERTIFICATE OF CORRECTION

| | |
|---|---|
| PATENT NO. | : 8,065,184 B2 |
| APPLICATION NO. | : 11/321076 |
| DATED | : November 22, 2011 |
| INVENTOR(S) | : Daniel Wright et al. |

Page 1 of 1

It is certified that error appears in the above-identified patent and that said Letters Patent is hereby corrected as shown below:

IN THE CLAIMS:

In column 17, line 18, claim 12, should read: "obtain a set of rated advertisements in response to a user"

Signed and Sealed this

Seventeenth Day of January, 2012

David J. Kappos
*Director of the United States Patent and Trademark Office*